United States Patent [19]

Adkison

[11] Patent Number: 5,090,940

[45] Date of Patent: Feb. 25, 1992

[54] DRUMMETTE DEBONER

[75] Inventor: Frank L. Adkison, Winfield, Iowa

[73] Assignee: Oscar Mayer Foods Corporation, Madison, Wis.

[21] Appl. No.: 685,834

[22] Filed: Apr. 16, 1991

[51] Int. Cl.$^5$ ............................................. A22C 17/04
[52] U.S. Cl. ..................................... 452/136; 452/138
[58] Field of Search ................ 452/136, 135, 138, 127

[56] References Cited

U.S. PATENT DOCUMENTS

| | | | |
|---|---|---|---|
| 2,857,619 | 10/1958 | Massengill | 17/1 |
| 3,216,056 | 11/1965 | Segur | 17/1 |
| 3,233,282 | 2/1966 | Segur | 17/45 |
| 3,510,908 | 5/1970 | Segur et al. | 17/1 |
| 4,216,565 | 8/1980 | Volk et al. | 17/1 |
| 4,299,009 | 1/1981 | Tournier | 17/1 |
| 4,327,463 | 5/1982 | Martin | 452/138 |
| 4,380,849 | 4/1983 | Adkison et al. | 17/11 |
| 4,488,332 | 12/1984 | Atteck et al. | 452/136 |
| 4,811,456 | 3/1989 | Heuvel | 452/136 |
| 4,893,378 | 1/1990 | Hazenbroek et al. | 452/136 |
| 4,944,067 | 7/1990 | Kulishen et al. | 452/138 |
| 5,030,163 | 7/1991 | Mielnik | 452/136 |

Primary Examiner—Willis Little
Attorney, Agent, or Firm—Michael, Best & Friedrich

[57] ABSTRACT

Apparatus for separating the meat from a meat carrying bone of an animal, wherein said bone is characterized by being elongated with a longitudinal axis and first and second opposite ends. The apparatus comprises a containing structure for receiving the meat carrying bone, a stop structure for selectively engaging one end of the bone, a stripping structure spaced from the stop structure so that the meat carrying bone is positionable between the stripping structure and the stop structure, the stripping structure including a structure defining a restricted opening generally in alignment with the stop structure relative to the longitudinal axis of the meat carrying bone, the restricted opening having a predetermined size corresponding to the thickness of the bone and being such that the bone passes through the opening and the meat carried by the bone is engaged by the walls defining the opening, and structure for producing relative movement between the stripping structure and the stop structure so that the meat carrying bone is moved into the opening and the walls of the opening apply a force to the meat, the force reacting against the stop structure engaging the one end of the bone and being directed generally longitudinally along the bone to strip the meat from the bone.

16 Claims, 3 Drawing Sheets

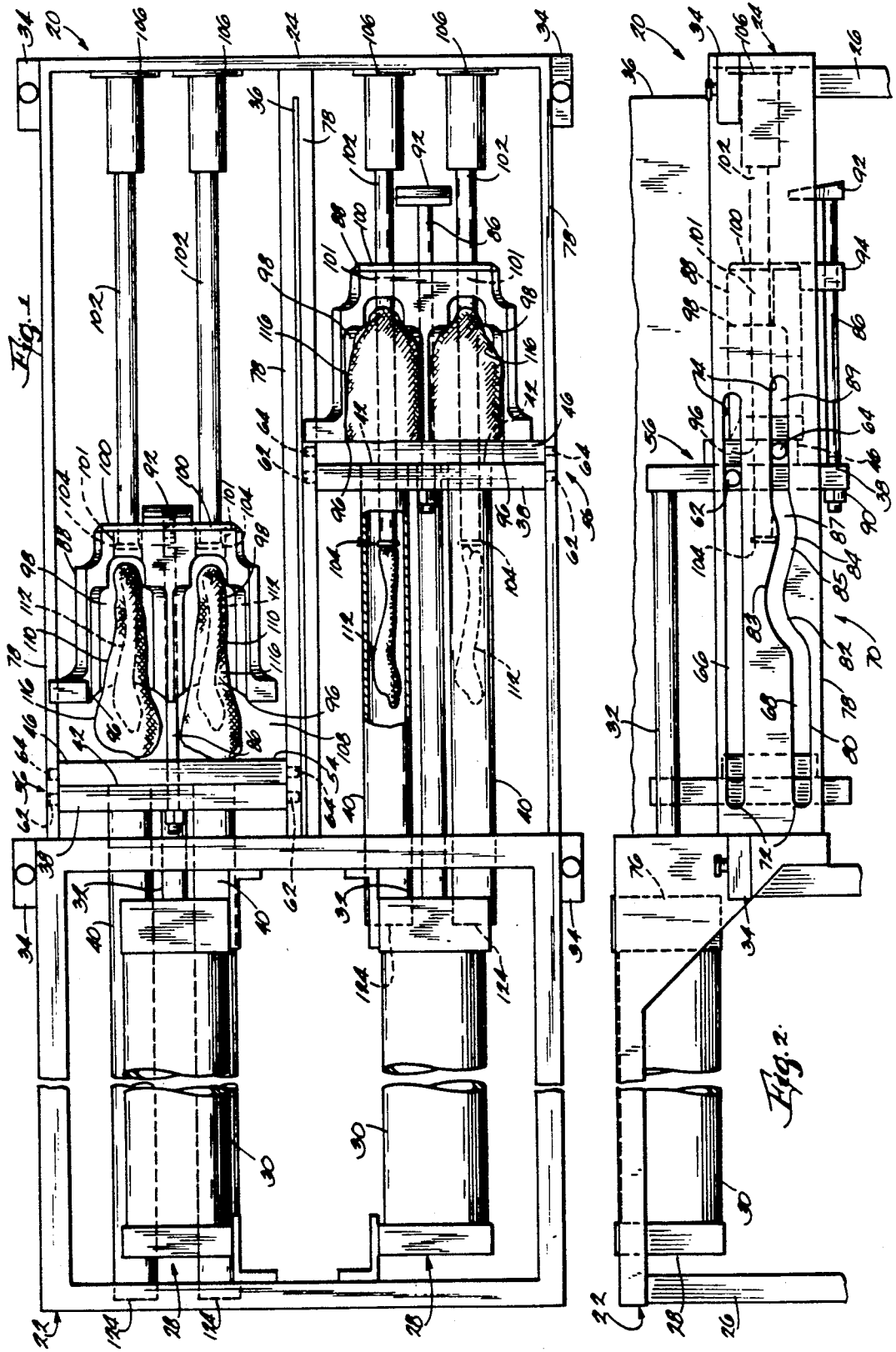

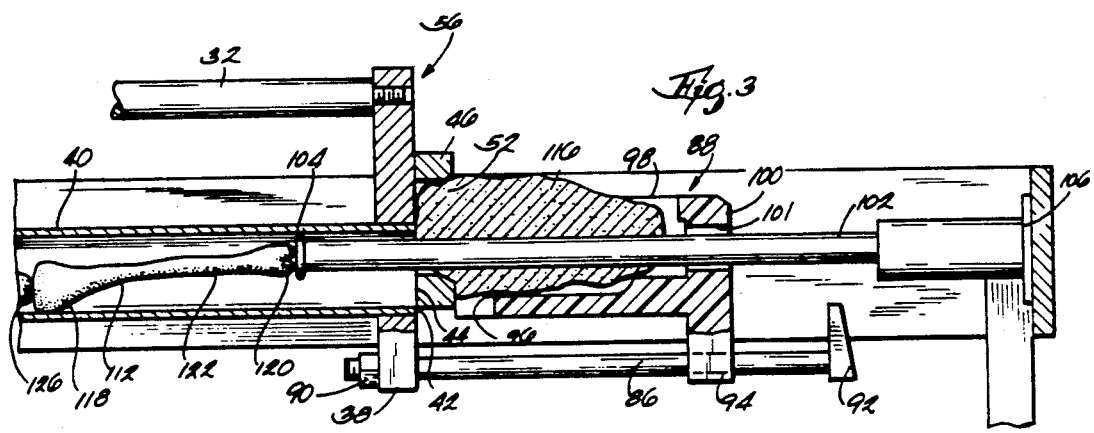
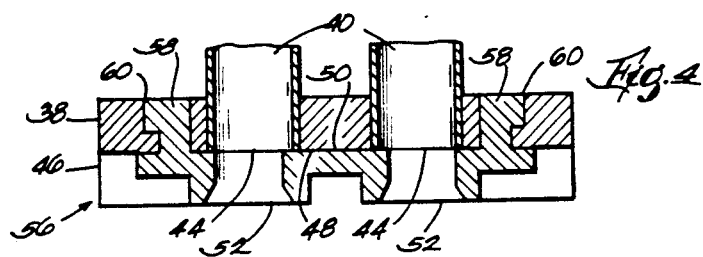
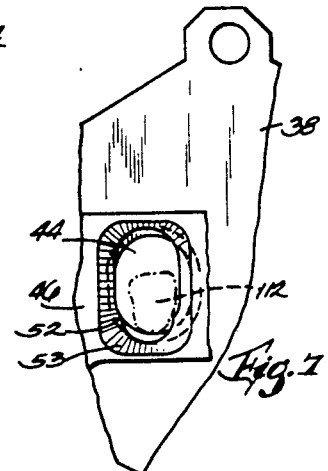
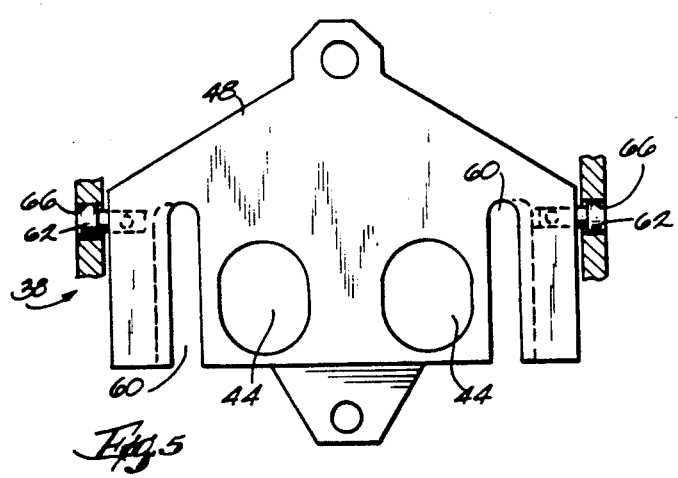
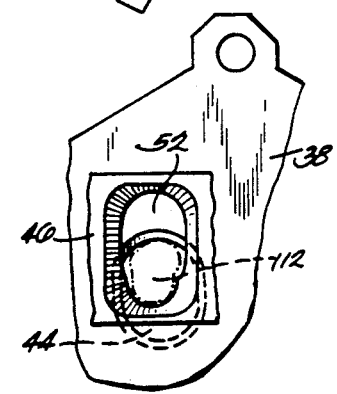
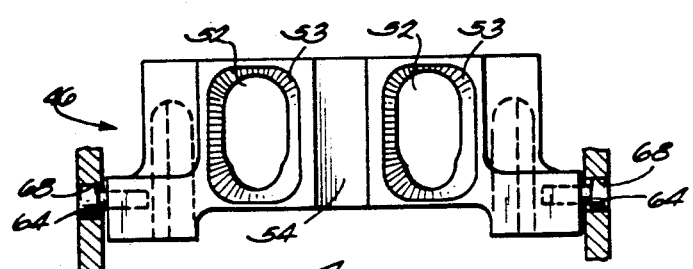

DRUMMETTE DEBONER

FIELD OF THE INVENTION

This invention relates to deboning devices, and more particularly to an apparatus for separating the meat from poultry drummettes.

BACKGROUND OF THE INVENTION

Deboning devices are well known and commonly employed in the meat processing industry. U.S. Pat. Nos. 4,380,849, 4,299,009, 3,510,908 and 2,857,619 disclose devices for separating the meat from certain types of bones of animals, such as poultry leg bones or ungulate leg bones and the like. These known devices act in a general way by applying opposing forces to the flesh and the bone components of the piece to be deboned. In some devices the strategy employed is to fix the meat component, and then to physically grasp and pull out the bone. Other known devices utilize a strategy of physically grasping the bone, and then using a separate component to scrape or strip the flesh away from the bone.

U.S. Pat. No. 4,380,849, assigned to the assignee of this invention, discloses an apparatus for removing the meat from poultry drum sticks. In this known device, components are variously arrayed to grasp the small end of the turkey drum stick bone, hold the flesh component of the drum stick, and score the drum stick about the base of the small end with rotating knifes, in order to loosen the meat from the tendons, gristle, and the other slender elongated cartilage tissues found at the lower end of poultry drum sticks. Finally, the bone is pulled away from the immobilized meat. These steps are found to be necessary in order to achieve the removal of a clean and high quality meat from poultry drum sticks.

In all these known devices the bone is physically grasped by some component of the device. In some cases this is done to keep the bone from moving with the flesh, as the device strips the meat away from the fixed bone. In other devices the grasped bone is subsequently pulled away from the further immobilized meat component. In either case, the bone must first be firmly grasped in order to prevent slipping. This slows the overall operation, and causes a decrease in the efficiency of the deboning operation.

Another problem with the known means for firmly grasping the bone in this manner is that they increase the chances of breaking or chipping the bone, which chips can be carried along with the stripped meat, lowering its quality and value.

Another difficulty presented by these known approaches is that bones come in varying sizes. A more fully automated bone grasping mechanism must be carefully attenuated with complex mechanisms for detecting resistance met by the grasping members to avoid chipping the bone.

A further difficulty presented by these devices is that the meat and/or the bone must be individually fixed or immobilized before initiating the deboning operation, thus making the overall operation of the device relatively slow and cumbersome. After the operation, the bone or the meat, or both, must somehow be detached from the mechanism to ready the device for the next operation.

For these and other reasons, the known deboning devices are not well adapted for use with bones like poultry drummettes. The deboning apparatus of this invention will find particular application in deboning poultry drummettes, most particularly turkey drummettes, and therefore, will be described in that context, but it should be appreciated that it has broader application.

A poultry drummette is different anatomically to a poultry drum stick. The bone of the turkey drummette is the humerus bone, which is analoguous to the femur or upper thigh bone of the leg portion. As a consequence there is little or no cartilage, gristle, or the numerous fine tendons such as are found in a poultry drum stick. The connective tissue present is not as elongated and is concentrated more at the thickened upper, or shoulder, region of the drummette bone.

Accordingly, an object of the invention is to provide an apparatus which is uniquely suited to simply removing meat from long bones containing reduced amounts of connective tissue.

Another object of the invention is to provide an apparatus for removing meat from poultry drummettes.

A further object of the invention is to provide an improved apparatus which is simple to use and which will rapidly remove a substantial portion of the meat from a poultry drummette.

A still further object of the invention is to provide an improved apparatus for removing meat from poultry drummettes and which greatly reduces the tendency of chipping or breaking the drummette bone.

A still further object of the invention is to provide a deboning apparatus which removes meat from the long bones of an animal without the operator having to initially fix either the bone or the meat.

These and other objects of the present invention will become apparent from the following detailed description and drawings. Although the invention is presently configured and designed to be used in conjunction with removing meat from turkey drummettes, the apparatus could be adapted for use in deboning meat from other long bones of poultry or other animals.

SUMMARY OF THE INVENTION

The invention includes apparatus for separating the meat from a meat carrying bone of an animal, wherein the bone is characterized by being elongated and having a longitudinal axis and first and second opposite ends. The apparatus comprises a container for receiving the meat carrying bone and a stop for selectively engaging one end of the bone. A stripper is spaced from the stop so that the meat carrying bone is positionable between the stripper and the stop. The stripper includes a restricted opening generally in alignment with the stop relative to the longitudinal axis of the meat carrying bone. The restricted opening has a predetermined size corresponding to the thickness of the bone and being such that the bone passes through the opening and the meat carried by the bone is engaged by the walls defining the opening. Also included are means for producing relative movement between the stripping means and the stop means so that the meat carrying bone is moved into the opening and the walls of the opening apply a force to the meat, the force reacting against the stop means engaging the one end of the bone and being directed generally longitudinally along the bone to strip the meat from the bone.

One such embodiment of the invention includes a container in the form of a generally elongated cup portion which is generally semicircular in cross section and open at the top for receiving the bone. A stop is generally aligned with the cup for selectively engaging one end of a bone positioned in the cup. The stripper is spaced from the stop so that the meat carrying bone is positionable between the stripper and the stop. The stripper includes a restricted opening generally in alignment with the stop relative to the longitudinal axis of the bone. The restricted opening has a predetermined size corresponding to thickness of the bone and being such that the bone passes through the opening and the meat carried by the bone is engaged by the walls defining the opening. Means for producing relative movement between the stripper and the stop is also included, so that the bone is moved into the opening and the walls of the opening apply to force to the meat, the force reacting against the stop means engaging the one end of the bone and being directed generally longitudinally along the bone to strip the meat from the bone.

Another embodiment of the invention is particularly adapted for separating the meat from a poultry bone and includes a generally elongated cup which is generally semicircular in cross section and open at the top for receiving the bone. A generally elongated rod is generally aligned with the cup for selectively engaging one end of a bone positioned in the cup portion. Plates are spaced from the rod and the cup is positioned between the plates and the rod. The plates include first and second plates each including openings therein generally in relative alignment and cooperating to define a restricted opening. The restricted opening is generally aligned with the rod relative to the longitudinal axis of the bone and has a predetermined size corresponding to thickness of the bone and being such that the bone passes through the opening and the meat carried by the bone is engaged by the walls defining the opening. Means are also included for moving the plate means relative to the rod and into engagement with the cup, in order to move the cup relative to the rod so that a bone in the cup is moved into the opening and the walls of the opening apply a force to the meat, the force reacting against the rod engaging the one end of the bone and being directed generally longitudinally along the bone to strip the meat from the bone. Additional means are included for moving the plates relative to each other to vary the amount of overlap of the separate plate openings to thereby vary the size of the restricted opening. That additional means includes cams connected with the separate plates and responsive to the movement of the plates relative to the rod for moving one of the plates relative to the other as the plates move over the bone. Also included are hollow tubes at the restricted opening positioned on the opposite side of the plate means. The range of movement of the plate means is such that the plate means moves over the rod to the extent that the rod extends into the hollow tube means, and the means for moving one of the plates relative to the other comprises cam means connected to plates and responsive to movement of the plates toward the rod. The cams are configured in accordance with the bone to generally size the restricted opening in accordance with the configuration of the bone.

An additional embodiment includes means for moving the plates in a reciprocal manner with the cup, as the plates are moved toward and away from the rod. The cup is selectively engaged by the plates as they are moved away from the rod, to move the cup away from the rod as well. When the plates are at rest, the cup is at rest and prior to movement the plates are spaced from the cup. A lost motion connection between the cup and the plates creates and maintains the spacing between the plates and the cup as the initial movement of the plates away from the rod occurs.

Other features and advantages of the invention will become apparent to those of ordinary skill in the art upon review of the following detailed description, claims, and drawings.

BRIEF DESCRIPTION OF THE DRAWINGS

FIG. 1 is a plan view of the apparatus shown with one pneumatic system in the rest position, and another pneumatic system at the end of a forward stroke.

FIG. 2 is a side elevation view of the apparatus of FIG. 1 showing the position of the apparatus at the most forward position of a cylinder stroke.

FIG. 3 is an enlarged partially cut away side elevation view of the apparatus of FIG. 1, containing a deboned drummette, during the most forward position of a cylinder stroke to depict the position of the bone and the deboned meat, as well as the positioning of a push rod within a bone tube.

FIG. 4 is sectional view of the plate system depicting a preferred engagement between the tube plate and the slide plate.

FIG. 5 is an elevation view the forward surface of a tube plate.

FIG. 6 is an elevation view the forward surface of a slide plate.

FIG. 7 is a cut away front elevational depiction of the position of the holes in the tube and slide plates before the contour of the cam tracks of the slide plate has raised the cam followers.

FIG. 8 is a cut away front elevational depiction of the position of the holes in the tube and slide plates after the contour of the cam tracks of the slide plate has raised the cam followers.

DETAILED DESCRIPTION OF THE PREFERRED

Figure 9:
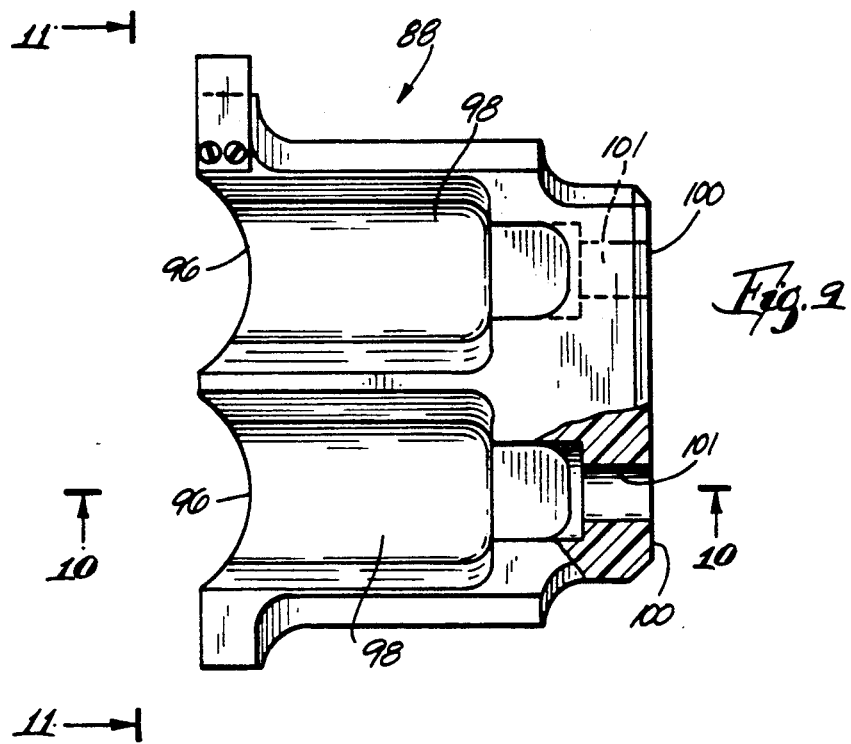
FIG. 9 is a plan view of preferred drummette cups for the apparatus with one of the drummette cups partially cut away to reveal a hole for a push rod.

The invention illustrated is one designed specifically for deboning turkey drummettes. The basic design of the invention, however, could easily be adapted by those skilled in the art for deboning operations for other meats.

The apparatus 20 embodying the invention is mounted on a frame 22, as best depicted in FIGS. 1 and 2. The frame is preferably made of steel plates and bars, and constructed so as to provide a working level platform 24 presented at a height suitable for comfortable use by an operator.

The frame is preferably of stainless steel, such as of stainless steel square tubing, and in the preferred embodiment the legs 26 of the frame are adjustable for height (adjustment not shown). The platform 24 containing the various working components of the deboning operation is of open construction providing support means for supporting and attaching the various members to be described herein. This open construction is particularly desirable as the preferred embodiment of the apparatus 20 is intended to deposit both the bones and deboned meat downwards, by gravity, into collecting vessels.

Drive means 28 is located at one end of the platform 24 and, in the preferred embodiment, this drive means includes two conventional pneumatic cylinders 30, although any suitable driving means could be utilized. Each pneumatic cylinder 30 operates to extend and retract a cylinder rod 32 horizontally into and out of the cylinder 30. In the preferred embodiment, the two air cylinders 30 operate independently, each air cylinder being separately controlled by hold down control buttons 34 and suitable, conventional circuitry (not shown). The two-hand hold down system provides a safety feature in that the cycling of the pneumatic cylinder will cease whenever pressure on either of the buttons for a given cylinder is removed, and thus requires that an operator have both hands out of the apparatus before and during operation. An additional safety feature is a plate of plexiglass 36 or some other suitable transparent material, which separates the working areas of the separate cylinder systems.

Although the invention can be envisioned as comprising any number of air cylinders 30, and though the illustrated embodiment utilizes two, cycling of the invention will be described in relation to the operation of a single independently operated pneumatic cylinder 30 arranged to debone two drummettes at a time. For this reason, corresponding parts associated with each cylinder have been identified by the same number.

A cylinder rod 32 extends externally from the pneumatic cylinder, and at its remote end is attached to a generally vertically disposed tube plate 38, best illustrate in FIGS. 3, 4 and 5. This vertical plate has two bone tubes 40 attached to and extending generally horizontally back from the plate toward the cylinder 30. The forward ends of the bone tubes 42 are disposed, one in each of two openings 44 in the plate. In the embodiment illustrated in FIG. 1, bone tubes 40 and the openings 44 into which they extend are elliptically shaped, stainless steel pipes.

A front or slide plate 46, which is best seen in FIGS. 3, 4 and 6, is affixed on the outer, or forward surface 48, of tube plate 44, and it is vertically disposed with its inner or rear surface 50 generally in contact with the forward surface 48 of the tube plate 38. The slide plate 46 is capable of vertical movement relative to the tube plate 38, which is fixed against vertical movement. The slide plate 46 also has two openings 52 which align with the openings 44 in tube plate 38. In the illustrated embodiment, the holes 52 in the slide plate 46 also are generally elliptical in shape, and the outer, or forward, surface 54 of the slide plate 46 is somewhat recessed around the holes 52. That is, generally angled surface 53 extend around the periphery of openings 52. These two plates 38 and 46 together operate in concert as a plate system 56 in the deboning operation.

The cylinder rod 32 of pneumatic cylinder 30, or the bone tubes 40, tube plate 38 and plate 44 are switchably attached to the frame 22. The actual attachment is conventional and for that reason is neither disclosed nor described in detail. The tube plate 38 and the slide plate 46 are engaged through suitable retaining means, such as tongue in groove engagements to permit relative vertical movement therebetween. In FIG. 4 such an engagement is shown in cross section, with a tongue 58 extending back from the rear surface 50 of the slide plate 46 and positioned within groove 60 cut into the tube plate 38 (see FIG. 5). Plate 38 is fixed and plate 46 can move vertically with respect to plate 38 but within the confines of slot 60.

With reference to FIGS. 5 and 6, cam followers 62 extend laterally from the vertical sides of the tube plate 38, and the slide plate 46 also has cam followers 64 extending laterally from its vertical sides. These followers are preferably in the form of rollers, which are engaged at their remote ends in cam tracks. More particularly, and as depicted in FIG. 2, the cam tracks 66 for the tube plate cam followers 62 are straight, while the cam tracks 68 for the slide plate cam followers 64 have a preselected contour. Though not depicted, identical cam tracks are provided for each plate for the cam followers 62 and 64 that are on the opposite side from those depicted and which are for the cam followers that are internal and nearest the plexiglass separator 36. Altogether, these cam tracks and followers provide a cam system 70 which determines the vertical movement between plates 38 and 44. The cam tracks 66 an 68 extend horizontally parallel to the direction of travel, i.e., extension and retraction, of the cylinder rod 32 from points 72 near the forward end 76 of the pneumatic cylinder 30 to points 74 remote from that end.

The cam tracks are formed in plates 78 secured to the support frame 22, and the cam followers 62 and 64 engaged in the tracks 66 and 68 provide additional support in steadying the horizontal movement of the plate system 56. The cam system 70 determines the movement of the two plates relative to one another upon the forward and return stroke of the cylinder rod 32. In the illustrated embodiment and with reference to FIG. 2, the cam followers 62 that are attached to the tube plate 38 travel in a relatively straight horizontal path due to the linear nature of its cam tracks 66. The cam tracks 68 for the cam followers 64 attached to the slide plate 46, however, have linear portions and portions which are displaced from the linear extension of the linear portions in a preselected manner, i.e., in accordance with the configuration of the drummette bone. Therefore, the slide plate 46 is moved vertically relative to the tube plate 38 at points during the horizontal movement of the plate system 56 to more effectively accomplish the deboning function.

More specifically, the preferred configuration for the cam tracks 68 of the slide plate 46 begins as a straight portion 80 extending horizontally over a preselected distance, and generally parallel to the cam tracks 66 of the tube plate 38. The cam tracks 68 of the slide plate 46 then have a portion 82 which curves upward rather steeply. This upward change initiates at a point corresponding transversely to the area just behind the large end of the bone of a drummette previously located within the apparatus. The reason for this will be more fully elaborated upon in the discussion of the deboning operation. The slide plate cam tracks 68 then extend generally horizontally again for a distance approximately the remaining length of a typical drummette. The track 68 curves downwardly from the uppermost point of curve 82, this is portion 83. Portion 83 merges into portion 85 which has a slight downward dip 84 connected by an upwardly directed portion 87 that merges with horizontal, linear end 89. This configuration is dictated by the general configuration of the drummette bone and for reasons more fully elaborated on later.

As illustrated in FIGS. 2 and 3, the plate system 56 has a return bar 86, preferably a metal rod, attached at one end to the bottom of the tube plate 38. The return bar 86 functions both to aid in aligning the direction of movement of the plate system 56, and as a means for returning the two drummette cups 88 to their rest position at the end of a deboning cycle. The return bar 86 is preferably bolted 90 to the tube plate 38 at the base of the plate system 56. The return bar 86 extends horizontally from its point of attachment 90 beneath the plate system 56 forwardly past the slide plate 46 to a point remote from the dual plate system 56. At its far end is attached a return plate 92. The return bar may pass through a slot or opening forming a guide 94 for the drummette cups 88, the slot or opening forming a guide 94 for the return bar 86, and also a means of engagement for the return plate 92 upon the retraction of the plate system 56, and thus the return bar 86, by the cylinder rod 32 at the end of a cycle.

Figure 10:
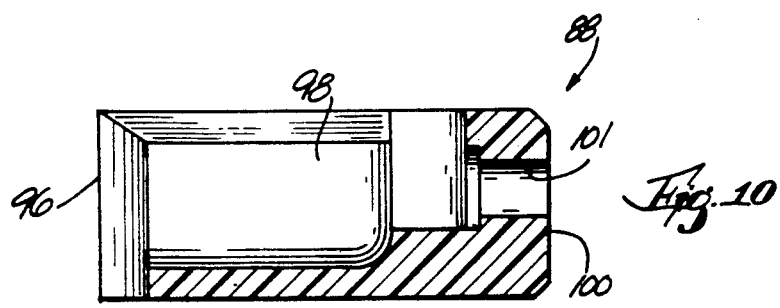
FIG. 10 is a sectional view of the drummette cups taken along the line 10—10 of FIG. 9, showing the position of the holes for the push rods.
Figure 11:
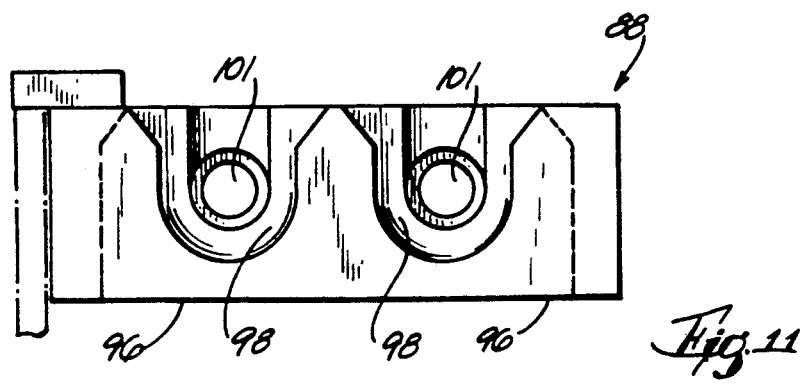
FIG. 11 is a sectional view of the drummette cups taken along the line 11—11 of FIG. 9.

The drummette cups 88, best seen in FIGS. 9, 10 and 11, each have an open end 96 which faces the forward surface 54 of the slide plate 46, a dished body forming meat pockets 98 and a remote, or closed end, 100, i.e., closed except for restricted openings 101. The two drummette cups 88 may form an integral unit, in one embodiment integrally formed from a block of a hard, relatively low-friction thermosetting material, such as Delrin, manufactured by DuPont. The remote ends 100 of the drummette cups 88 have openings 101 which snugly surround horizontally disposed push rods 102. The push rods 102 each have one end 104 in the remote end 100 of a drummette cup when the mechanism is in its rest position, and the other end 106 fixedly attached to the support frame 22.

A gap is formed between the forward surface 54 of the slide plate 46 and the open ends 96 of the drummette cups 88 at times between deboning operations, i.e., when the mechanism is in its rest position between cycles of the pneumatic cylinder 30. When a cycle begins, the cylinder rod 32 pushes the plate system 56 forward, and the forward surface 54 of the slide plate 46 engages the open ends 96 of the drummette cups 88. As can be seen in FIG. 11, the drummette cups are dished in cross section to form mean pockets 98 generally aligned with openings 44 and 52 and push rods 102. Therefore, when a drummette is placed in a meat pocket 98 the bone 112 in the drummette is aligned with the openings 44 and 42 in the plates and the push rod. The drummette cups 88 are pushed backwards, and slide along the push rods 102, which are also aligned with the openings 44 and 42 in the plate system 56. During the portion of the operation when the gap 108 is being closed, the return bar 86 slides freely through the guide slot 94 which is attached beneath the drummette cups 88.

When the cylinder rod 32 is cycling back into the pneumatic cylinder 30, the return bar 86 again passes freely through the guide 94 slot until the return plate 92 engages the guide slot 94. The return plate 92 then serves to pull the drummette cups 88 back with the plate system 56, and maintains the gap distance 108.

More specifically, the drummette cups 88 are formed generally as half cylinders, with an open end 96, a remote end 100 and a semi-cylindrical open body which forms the meat pocket 98. The push rod 102 extends through each drummette cup hole 101. These push rods 102 are preferably cylindrical stainless steel rods. The push rods 102 are fixed and immobile, thus the forward cycling of the cylinder rod 32 and plate system 56 serves to push the drummette cups 88 over the push rods 102, and upon continued forward cycling the push rods 102 will then extend through the drummette cups 88, specifically into and through the metal pockets 98. At the forward most point of the cycle, the push rods 102 extend all the way through the meat pockets 102 and into the bone tubes 40 that are attached to the tube plate 38. The push rods 102 are preferably aligned so that each is at or near the top of the inner wall surface of its bone tube 40.

The drummette cups 88, therefore, cycle back and forth along the push rods 102 in response to cylinder generation and such that the push rods 102 alternately extend into and out of the meat pockets 98. When the drummette cups 88 are pulled off of the rods 102 at the end of the return stroke of the cylinder 30, rods 102 extend only into the hole 101 at the remote end 100 of the cups 88. After the plate system 56 has pushed the drummette cups 88 along the push rods 102, i.e., after the pneumatic cylinder 30 has cycled the cylinder rod 32 forward, the push rods 102 extend through the metal pockets 98, through the holes 44 and 52 of the plates and into the bone tubes 40.

In the illustrated embodiment of the invention, two such described systems are arrayed side by side on a single support frame 22. In operation, an operator operates only one pneumatic cylinder system at a time, and will thus operate two drummette cups 88, each on its own push rod 102 and with a single pneumatic cylinder 30 operated by the two hold down push buttons 34 adjacent the operator.

To remove meat from a turkey drummette 110, the operator takes two such drummettes 110 and places one in each of the meat pockets 98 of the drummette cups 88. The drummette portion 110 is the upper wing or shoulder portion, containing the elongated humerus bone 112. It has a thickened portion of white meat 116 attached towards the thickened shoulder end 118, which is the thickest portion of the bone 112. The operator places each drummette 110 horizontally in a meat pocket 98 such that the smaller elbow end 120 of each of the bones 112 is adjacent the hole 101 within the remote cup end 100 where the ends of the push rods 102 are positioned. The longitudinally spaced and larger shoulder ends 118 are in the open end 96 of the drummette cup 88 and are nearest the forward surface 54 of the slide plate 46 of the plate system 56. The apparatus then operates such that the meat 116 of these drummettes is virtually completely separated from the bone 112.

More, specifically, upon depression of both control buttons 34, the pneumatic cylinder 30 extends the cylinder rod 32. That rod 32 moves the entire plate system 56 forward with the forward surface 54 of the slide plate 46 engaging the open ends 96 of the drummette cups 88, while the openings 52 of the slide plate 46 pass around the shoulder ends 118 of the drummette bones 112. As the meat 116 surrounding the bones 112 encounters the forward surface 54 of the slide plate 46, the elbow or smaller ends 120 of the bones 112 are pushed against and engage the ends 104 of the push rods 102, this prevents the bones 112 from moving away from the advancing plate system 56. As the cylinder rod 32 continues to cycle forward, the cam followers 62 and 64 continue along their cam tracks 66 and 68, eventually entering the area where the lower cam followers 64 and the attached slide plate 46 are both raised by the upwardly displaced contour of the lower cam track 68. At this point, plate 46 moves relative to plate 38 and the holes 44 and 52 in the separate plates become misaligned, as best seen in FIGS. 7 and 8, and they begin to overlap one another, reducing the total openings formed by the previously aligned holes, and closing at a point after the passage of the thickened end 118 into openings 44 and 52. This also closes the formed opening down onto the narrower, long portion 122 of the drummette bone 112.

More specifically, as the plate system 56 travels in response to cylinder rod extension, the shoulder ends 118 of bones 112 pass into the openings. Also, the plate system 56 advances the forward surface 54 of the slide plate 46 encounter the meat portions 116 of the drummettes 110, and the openings in the plates 44 and 52 begin to reduce and close onto the bone 112 at a point just beyond their thickened shoulder ends 118. This action begins to strip the meat from the bone. As the bone ends 118 extend more fully past the holes 44 and 52 and into the bone tubes 40 the slide plate 46 is raised by its cam tracks 68 and followers 64, to such an extent that the bottoms of the holes 52 in the slide plate come close enough to the tops of the openings 44 of the tube plate 38 to cause the openings to close onto the drummette bones 112 just behind their thickened ends 118.

As the holes 44 and 52 of the plate system 56 restrict and close down onto the bones 112, the meat 116 is prevented from entering the reduced openings and is pushed off of the bones 112 by the surface of the slide plate 46. The slide plate 46 is generally held raised for the remaining of the deboning operation, to prevent meat 116 from entering these reduced openings. The major cartilage or gristle attachment of the meat is in the area of the elongated end 118, so that once separated in that area the remaining separation of the meat is relatively easy. The meat 116 is pushed up onto the forward surface 54 of the slide plate 46 and is thereby stripped from the bones 112 as the cylinder 30 continues to push the drummette cups 88 back along the push rods 102.

At this point it should be noted that the profiles of the cam tracks 68 of the slide plate 46 are determined by the general configuration of the bone 112 being handled. That is, the tracks 68 are linear for an extension 80 corresponding to travel over the large ends 118 of the bones 112, and travel of those large end 118 into the bone tubes 40. During this initial travel some stripping pressure is applied to the meat. The track profiles slope upwardly (82) after this large bone portion, raising the slide plate 46 and restricting the openings through the plates into the bone tubes 40. This forces the opening walls onto the meat after the larger end 48 is past applying increased stripping force on the meat to sever the cartilage attachment. The cam track profiles then maintain that opening to correspond to the bone 112 diameter, raising the plate 46 to further restrict the opening if necessary. All of the meat 116 is thereby pushed from the bone 112 into the meat pockets 98 of the drummette cups 88, and the bone 112 is deposited into the bone tube 40 by the push rods 102. There is a momentary lowering (83, 84 and 85) of the cam tracks 68 and corresponding plate 46, then a slight raising of the cam track, and corresponding plate 46, to accommodate the end 104 of the push rods 102, and to allow the push rods 102 unrestricted passage through the holes 44 and 52 of the plate system 56 and into the bone tubes 40.

During a cycle the remote elbow ends 120 of the bones 112 are continuously in contact with the ends 104 of the push rods 102, until the bones 112 detach from the meat 116 and are deposited in the bone tubes 40. Specifically, the push rods 102 extend out of the holes 101 in the drummette cups 88 and into the meat pockets 98, continuously contacting these elbow ends 120, and immobilizing the bones 112 to keep them from being displaced longitudinally along with the meat 116 as the diminished opening formed by the misaligned holes 44 and 52 of the plate system 56 continue to scrape meat from the surfaces of the bones 112. As the drummette cups 88 move along the lengths of the push rods 102, the push rods 102 will extend further and further into the meat pockets 98, until ultimately the push rods themselves will extend into and through the holes of the plate system 56. At this point the bones 112 will become completely detached from the meat 116. The bones 112 drop into the bone tubes 40, one bone in each tube, where they pass along and exit out of the remote ends 124 of the bone tubes 40. Preferably the tubes 40 are angled so that the fall of the bones 112 is assisted by gravity, but additionally, each bone 112 will serve to push along the immediately preceding bone. A vessel, conveyor or some other suitable means (not shown) can be provided beneath the remote ends 124 of the bone tubes 40 for collecting the bones 112 as they come out.

While the push rods 102 extend into the bone tubes 40 the holes 44 and 52 of the plate system 56 surround the push rods 102 rather than the bones 112. The meat 116 that has been detached from the bones 112 now has been pushed onto the push rods 102, and the push rods 102 may even extend into the meat 116 much as the bones 112 had previously. In other words, the bones 112 have been largely displaced by the push rods 102, and the latter are surrounded by drummette meat 116.

The meat 116 is now removed from the push rods 102 by the pneumatic cylinder 30 retracting the cylinder rod 32. The plate system 56 is pulled away from the drummette cups 88, leaving a gap 108 between the forward surface 54 of the slide plate 46 and the open ends 96 of the drummette cups 88. The return plate 92 limits the size of this gap 108, by encountering the guide 94 attached to the bottom of the drummette cups 88. When that engagement occurs the drummette cups 88 is pulled back along with the plate system 56 being retracted by the cylinder rod 32. This maintains the gap 108 at a predetermined distance. This gap distance is controlled and maintained by having the return bar 86 longer than the distance between the forward surface 54 of the slide plate 46 and the closed ends of the drummette cups 88. Therefore, on initial retraction of the cylinder rod there is lost motion between the drummette cup 88 and rod 86 equal to the desired gap 108. After the lost motion has been taken up the plates and drummette cups move in unison to the end of the return on retraction stroke.

As the drummette cups 88 are pulled back with the plate system 56 by the return bar 86 they eventually are pulled off from the push rods 102, and the meat 116 that has been pushed up on the push rods 102 is now detached from the push rods 102 by the remote ends 100 of the drummette cups 88. As the push rods 102 are dimensioned to fit snugly within the holes 101 provided at the remote ends 100 of the drummette cups 88, the meat 116 is cleanly pulled off the push rods 102 by this action. When the cylinder rod 32 comes to a stop within the pneumatic cylinder 30 at the end of the cycle, the now completely free and detached meat 116 falls out of the meat pockets 98, one meat portion 116 off of each open end 96 of the two drummette cups 88. The gap 108 allows this meat 116 to fall away and through the open construction of the support frame 22. A vessel, conveyor or other suitable means (not shown) can be provided beneath the gap 108 for collecting the deboned meats.

At this point, the apparatus 20 is ready for the next deboning operation, as the meat 116 and the bones 112 have both been removed from the apparatus. The operator simply places two more drummettes 110 in the proper orientation in the meat pockets 98 of the drummette cups 88 and depresses the two control buttons 34 to initiate the next process cycle.

The bone 112 that is removed from turkey drummettes 110 by this operation is left with only small amounts of metal and connective tissue attached at the shoulder or thickened knuckle portion 118. The length 122 of the bone is scraped clean by the action of the co-acting holes 44 and 52 of the plate system 56. The apparatus of the invention further does not chip or break he bones 112, because of the unique manner in which the bones 112 are immobilized, and as well because the openings formed by the co-acting holes 44 and 52 within the plate system 56, controlled by the cam system 70, approximate the bone 112 contours. The cam tracks 66 and 68 allow the openings formed by the plate system to remain large until the thickened knuckle portion 118 of the bone 112 is past, and then constricts the opening about the bone 112 in order to efficiently scrape the remaining bone 112 of meat 116. This reduces the opportunity for chipping or breaking the bones 112, because no clamping or actual grasping of the bone 112 is required and yet the thickened portions 118 of the bones 112 are accommodated by the cam system.

Thus, the operator of this apparatus does not need to initially affix or immobilize either the meat 116 or the bone 112 of a drummette 110 before beginning the operation. The apparatus itself acts to immobilize the bones 112 through the action of the push rods, while the co-acting plate system 56 opens and constricts its jointly opening to effectively grasp and push off the meat 116. The meat 116 is scraped forward across the bone 112 towards the immobilized elbow end 120 which is held against the push rod. Therefore, there is no need for the operator to clamp or secure either the bone 112 or the meat 116 before the operation, or to detach or separate either the bone 112 or the meat 116 after the operation.

The operation of the deboning apparatus of the invention can be done at a rapid pace, partially because it is unnecessary to secure the bone and meat before the beginning of the operation. The apparatus of the invention can, for example, debone two drummettes each time at a rate of 7 cycles per 15 seconds, or 28 cycles per minute. This period of operation is about as fast as the amount of time an operator could be expected to require to properly orient the drummettes within the cup and to depress the control buttons, thus time for the operation of the apparatus itself will not be a limiting factor to the speed of the overall deboning operation.

This rapid processing is well adapted for mass production, increasing the amount of meat that can be processed by an operator. Additionally, the apparatus provides a clean and better quality meat, with little or no connective tissue and no bone chips, and this increases the value and quality of the resulting meat. Also, there is less waste in that substantially all of the meat portion of the drummette is removed leaving only a very little bit attached to the connective tissue at the thickened shoulder end.

The apparatus of the invention could easily be adapted to work with other meat carrying bones, and although one embodiment of the present invention has been illustrated and described, it will be apparent to those skilled in the art that various changes and modifications may be made therein without departing from the spirit of the invention or from the scope of the appended claims.

What is claimed is:

1. Apparatus for separating the meat from a poultry bone and wherein said bone is characterized by being elongated and having a longitudinal axis and first and second opposite ends, said apparatus comprising, in combination, containing means including a generally elongated cup portion which is generally semicircular in cross section and open at the top for receiving said bone, a generally elongated rod generally aligned with said cup portion for selectively engaging one end of a bone positioned in said cup portion, plate means spaced from said rod means and said containing means positioned between said plate means and said rod, said plate means includes first and second plates each including means defining openings therein generally in relative alignment and cooperating to define a restricted opening, said restricted opening generally aligned with said rod relative to the longitudinal axis of said bone and having a predetermined size corresponding to thickness of said bone and being such that said bone passes through said opening and the meat carried by said bone is engaged by the walls defining said opening, means for moving said plate means relative to said rod and into engagement with said containing means to move said containing means relative to said rod so that a bone in said cup portion is moved into said opening and the walls of said opening apply a force to said meat, said force reacting against the rod engaging said one end of said bone and being directed generally longitudinally along said bone to strip said meat from said bone, means for moving said plates relative to each other to vary the amount of overlap of said separate plate openings to thereby vary the size of said restricted opening and including cam means connected with said separate plates and responsive to said means for moving said plates relative to said rod for moving one of said plates relative to the other as said plates move over a bone contained in said cup, hollow tube means at said restricted opening and, relative to said containing means, positioned on the opposite side of plate means, and wherein the range of movement of said plate means is such that said plate means moves over said rod to the extent that said rod extends into said hollow tube means, and said means for moving one of said plates relative to the other comprises cam means connected to plates and responsive to movement of said plates toward said rod, said cam means configured in accordance with said bone to generally size said restricted opening in accordance with the configuration of said bone.

2. The apparatus of claim 1 wherein said means for moving said plate means relative to said rod reciprocates said plate means toward and away from said rod and includes means selectively engageable with said containing means as said plate means is moving away from said rod to engage and move said containing means away from said rod, wherein, when said means for moving said containing means is at rest and prior to movement thereof to move said containing means relative to and toward said rod, said plate means is spaced from containing means, and including means defining a lost motion connection between said containing means and said plate means in the initial movement of said plate means away from said rod so that said spacing between said plate means and said containing means is maintained.

3. Apparatus for separating the meat from a poultry bone and wherein said bone is characterized by being elongated and having a longitudinal axis and first and second opposite ends, said apparatus comprising, in combination, containing means including a generally elongated cup portion which is generally semicircular in cross section and open at the top for receiving said bone, a generally elongated rod generally aligned with said cup portion for selectively engaging one end of a bone positioned in said cup portion, plate means spaced from said rod means and said containing means positioned between said plate means and said rod, means defining a restricted opening in said plate means and generally aligned with said rod relative to the longitudinal axis of said bone, said restricted opening having a predetermined size corresponding to thickness of said bone and being such that said bone passes through said opening and the meat carried by said bone is engaged by the walls defining said opening, and means for moving said plate means relative to said rod and into engagement with said containing means to move said cup portion into contact with said plate means, and said bone moves into said opening and the walls of said opening apply a force to said meat, said force reacting against the rod engaging said one end of said bone and being directed generally longitudinally along said bone to strip said meat from said bone.

4. The apparatus of claim 3
wherein said plate means includes first and second plates,
wherein said plates each include means defining an opening therein generally in relative alignment, said openings defining said restricted opening,
including means for moving said plates relative to each other to vary the amount of overlap of said separate plate openings to thereby vary the size of said restricted opening, and
including means connected with said separate plates and responsive to said means for moving said plates relative to said rod for moving one of said plates relative to the other as said plates move over a bone contained inn said cup shaped portion.

5. The apparatus of claim 4
including hollow tube means at said restricted opening and, relative to said containing means, positioned on the opposite side of plate means, and
wherein the range of movement of said plate means is such that said restricted opening moves over said rod to the extent that said rod extends into said hollow tube means.

6. The apparatus of claim 5
wherein said means for moving one of said plates relative to the other comprises cam means connected to said plates and responsive to movement of said plates toward said rod, said cam means configured in accordance with said bone to generally size said restricted opening in accordance with the configuration of said bone.

7. The apparatus of claim 6
wherein said means for moving said plate means relative to said rod reciprocates said plate means toward and away from said rod and includes means selectively engageable with said containing means as said plate means is moving away from said rod to engage and move said containing means away from said rod, wherein, when said means for moving said containing means is at rest and prior to movement thereof to move said containing means relative to and toward said rod, said plate means is spaced from containing means, and including means defining a lost motion connection between said containing means and said plate means in the initial movement of said plate means away from said rod so that said spacing between said plate means and said containing means is maintained.

8. Apparatus for separating the meat from a poultry bone and wherein said bone is characterized by being elongated and having a longitudinal axis and first and second opposite ends, said apparatus comprising, in combination, containing means including a generally elongated cup portion which is generally semicircular in cross section and open at the top for receiving said bone, stop means generally aligned with said cup means for selectively abutting one end of a bone positioned in said cup portion, stripping means spaced from said stop means so that said meat carrying bone is positionable between said stripping means and said stop means, said stripping means including means defining a restricted opening generally in alignment with said stop means relative to the longitudinal axis of said bone, said restricted opening having a predetermined size corresponding to thickness of said bone and being such that said bone passes through said opening and the meat carried by said bone is engaged by the walls defining said opening, and means for producing relative movement between said stripping means and said stop means so that said bone is moved into said opening and the walls of said opening apply a force to said meat, said force reacting against the stop means engaging said one end of said bone and being directed generally longitudinally along said bone to strip said meat from said bone.

9. The apparatus of claim 8 wherein the range of movement of said plate means is such that said containing means is moved to overlap said rod to the extent that said rod extends into restricted opening.

10. The apparatus of claim 9
including hollow tube means at said restricted opening and, relative to said containing means, positioned on the opposite side of plate means, and
wherein the range of movement of said plate means is such that said opening moves over said rod to the extent that said rod extends into said hollow tube means, wherein said means for moving said plate means reciprocates and said plate means toward and away from said rod and includes means selectively engageable with said containing means as said plate means is moving away from said rod to engage and move said containing means away from said rod, wherein when said means for moving said containing means is at rest and prior to movement thereof to move said containing means relative to and toward said rod, said plate means is spaced from containing means, and including means defining a lost motion connection between said containing means and said plate means in the initial movement of said plate means away from said rod so that said spacing between said plate means and said containing means is maintained.

11. Apparatus for separating the meat from a meat carrying bone of an animal and wherein said bone is characterized by being elongated and having a longitudinal axis and first and second opposite ends, said apparatus comprising, in combination, containing means for receiving said meat carrying bone, stop means for selectively engaging one end of said bone, stripping means spaced from said stop means so that said meat carrying bone is positionable between said stripping means and said stop means, said stripping means including means defining a variable size opening generally in alignment with said stop means relative to the longitudinal axis of said meat carrying bone, said opening when engaging said meat carrying bore being variable in size to correspond to the thickness of said bone and being such that said bone passes through said opening and the meat carried by said bone is engaged by the walls defining said opening, and means for producing relative movement between said stripping means and said stop means so that said meat carrying bone is moved into said opening and the walls of said opening apply a force to said meat, said force reacting against the stop means engaging said one end of said bone and being directed generally longitudinally along said bone to strip said meat from said bone.

12. The apparatus of claim 11 wherein said containing means includes a generally elongated cup portion which is generally semicircular in cross section and open at the top for receiving said meat carrying bone.

13. The apparatus of claim 12 wherein
said stop means comprises a relatively fixed rod,
said cup portion is moved relative to said rod,
said means for producing movement of said cup portion includes plate means in which said restricted opening is formed, and
said plate means engages said containing means to move said containing means relative to said rod.

14. The apparatus of claim 13 wherein the range of movement of said plate means is such that said containing means is moved to overlap said rod to the extent that said rod extends into said restricted opening.

15. The apparatus of claim 14
including hollow tube means at said restricted opening and, relative to said containing means, positioned on the opposite side of said plate means, and
wherein the range of movement of said plate means is such that said opening moves over said rod to the extent that said rod extends into said hollow tube means.

16. The apparatus of claim 15
wherein said means for moving said plate means reciprocates said plate means toward and away from said rod and includes means selectively engageable with said containing means as said plate means is moving away from said rod to engage and move said containing means away from said rod,
wherein, when said means for moving said containing means is at rest and prior to movement thereof to move said containing means relative to and toward said rod, said plate means is spaced from said containing means, and
including means defining a lost motion connection between said containing means and said plate means in the initial movement of said plate means away from said rod so that said spacing between said plate means and said containing means is maintained.

* * * * *

UNITED STATES PATENT AND TRADEMARK OFFICE
CERTIFICATE OF CORRECTION

PATENT NO. : 5,090,940
DATED : February 25, 1992
INVENTOR(S) : Frank L. Adkison

It is certified that error appears in the above—identified patent and that said Letters Patent is hereby corrected as shown below:

Column 7, line 33, after "gap" and before "is" insert --108--.

Claim 1, column 12, line 19, after "rod" and before "and" delete "means".

Claim 3, column 13, line 25, after "rod" and before "and" delete "means".

Claim 4, column 13, line 59, "inn" should be --in--.

Signed and Sealed this

Twenty-fifth Day of May, 1993

Attest:

MICHAEL K. KIRK

Attesting Officer

Acting Commissioner of Patents and Trademarks